US011886612B2

United States Patent
Hsy et al.

(10) Patent No.: US 11,886,612 B2
(45) Date of Patent: Jan. 30, 2024

(54) CONSENT PROVENANCE AND COMPLIANCE TRACKING OVER A COMPLEX CONSUMER DATA SUPPLY CHAIN USING BLOCKCHAIN DISTRIBUTED LEDGER

(71) Applicant: LiveRamp, Inc., San Francisco, CA (US)

(72) Inventors: Joe Hsy, Menlo Park, CA (US); Tsz Ling Christina Leung, Foster City, CA (US); Matt LeBaron, Salinas, CA (US); Arthur Coleman, Carmel Valley, CA (US)

(73) Assignee: LiveRamp, Inc., San Francisco, CA (US)

( * ) Notice: Subject to any disclaimer, the term of this patent is extended or adjusted under 35 U.S.C. 154(b) by 215 days.

(21) Appl. No.: 17/275,622

(22) PCT Filed: Sep. 10, 2019

(86) PCT No.: PCT/US2019/050356
§ 371 (c)(1),
(2) Date: Mar. 11, 2021

(87) PCT Pub. No.: WO2020/055829
PCT Pub. Date: Mar. 19, 2020

(65) Prior Publication Data
US 2022/0050915 A1 Feb. 17, 2022

Related U.S. Application Data

(60) Provisional application No. 62/730,278, filed on Sep. 12, 2018.

(51) Int. Cl.
*G06F 21/62* (2013.01)
*G06F 16/27* (2019.01)
(Continued)

(52) U.S. Cl.
CPC ......... *G06F 21/6245* (2013.01); *G06F 9/547* (2013.01); *G06F 16/27* (2019.01);
(Continued)

(58) Field of Classification Search
CPC ... H04L 21/6245; H04L 21/64; H04L 9/3239; H04L 9/50; H04L 67/1095; G06F 16/27
See application file for complete search history.

(56) References Cited

U.S. PATENT DOCUMENTS 9,635,000 B1    4/2017  Muftic
2014/0344015 A1  11/2014  Puertolas-Montanes et al.
(Continued)

FOREIGN PATENT DOCUMENTS

CN    106600405 A    4/2017
WO    2018037148 A1    3/2018

OTHER PUBLICATIONS

Xtelligent Media, LLC, "Exploring the Use of Blockchain for EHRs, Healthcare Big Data," downloaded from https://healthitanalytics.com/features/exploring-the-use-of-blockchain-for-ehrs-healthcare-big-data (2018).
(Continued)

*Primary Examiner* — Robert B Leung

(57) ABSTRACT

The invention is a system based on decentralized ledgers to enable compliance with privacy regulations. A consumer identifier (consumer ID) allows consent provenance to be saved in a shared decentralized ledger. The consent ID also empowers consumers to query as to how their data has been moved through the data supply chain. The consumer data itself is not stored in the blockchain, only consents and data transfer events. A consent API allows companies to enter the original consumer consent in a consent ledger; a data transfer API allows companies to record transfers from one
(Continued)

to another; and a subscription API allows companies to be notified of changes to a given consent.

6 Claims, 4 Drawing Sheets

(51) Int. Cl.
*G06F 9/54* (2006.01)
*G06F 21/64* (2013.01)
*H04L 9/32* (2006.01)
*H04L 9/00* (2022.01)

(52) U.S. Cl.
CPC ............ *G06F 21/64* (2013.01); *H04L 9/3239* (2013.01); *H04L 9/50* (2022.05)

(56) References Cited

U.S. PATENT DOCUMENTS

| | | | |
|---|---|---|---|
| 2015/0149362 | A1 | 5/2015 | Baum et al. |
| 2016/0225000 | A1 | 8/2016 | Glasgow |
| 2017/0046806 | A1 | 2/2017 | Haldenby et al. |
| 2017/0111175 | A1 | 4/2017 | Oberhauser et al. |
| 2017/0286717 | A1 | 10/2017 | Khi et al. |
| 2018/0082023 | A1 | 3/2018 | Curbera et al. |
| 2018/0082024 | A1* | 3/2018 | Curbera ................ G16H 40/63 |
| 2018/0144153 | A1 | 5/2018 | Pead |
| 2018/0247063 | A1 | 8/2018 | Li |
| 2018/0247302 | A1 | 8/2018 | Armstrong et al. |
| 2018/0247320 | A1 | 8/2018 | Gauld |
| 2018/0248699 | A1 | 8/2018 | Andrade |
| 2018/0285839 | A1* | 10/2018 | Yang .................. G06Q 20/3829 |
| 2019/0028277 | A1* | 1/2019 | Jayachandran ......... H04L 9/085 |
| 2019/0087892 | A1* | 3/2019 | Pinski .................... H04L 9/0637 |
| 2019/0236286 | A1* | 8/2019 | Scriber ............... H04L 63/0442 |
| 2019/0327239 | A1* | 10/2019 | Ferguson .............. H04L 63/102 |
| 2020/0067709 | A1* | 2/2020 | Brown ................. H04L 9/3265 |

OTHER PUBLICATIONS

Healthverity, "Leverage Blockchain Technology to Aggregate and Manage Customer Data Use Permissions," downloaded from https://healthverity.com/solutions/healthverity-consent/ (2018).

Axonium, "Blockchain and the Consent Quandary: Unconsented de-identified data," downloaded from https://medium.com/@Axonium_org/blockchain-and-the-consent-quandary-unconsented-de-identified-data-24aef443ce9f (2018).

Hu-manity.co, "Hu-manity.co Collaborates with IBM Blockchain on Consumer App to Manage Personal Data Property Rights," downloaded from https://hu-manity.co/hu-manity-co-collaborates-with-IBM-blockchain-on-consumer-app-to-manage-personal-data-property-rights/ (2018).

Machine English translation of CN106600405A, Apr. 26, 2017.

English translation of Office action in Japanese patent application No. 2021-513815 (dated Aug. 31, 2023).

\* cited by examiner

CONSENT PROVENANCE AND COMPLIANCE TRACKING OVER A COMPLEX CONSUMER DATA SUPPLY CHAIN USING BLOCKCHAIN DISTRIBUTED LEDGER

CROSS-REFERENCE TO RELATED APPLICATIONS

This application claims the benefit of U.S. provisional patent application No. 62/730,278, filed on Sep. 12, 2018. Such application is incorporated herein by reference in its entirety.

BACKGROUND OF THE INVENTION

Currently, many companies—especially those in the marketing and advertising industry—obtain consumer data from external sources and also pass on consumer data to other companies for purposes such as personalizing ads. Much of this data does not come with any proof of explicit consumer consent or any link to the original point when the data was collected. Furthermore, such information typically does not contain proof of consent as it flows through a data supply chain. This makes it very difficult to comply with new privacy regulations such as the General Data Protection Regulation (GDPR) within the European Union, because there is no simple means to determine the chain of custody (provenance) of a given piece of data.

The manner in which consents are being stored may be different from company to company. This has two elements. The first is what consent data is maintained by a given company (its ontology); the second is the layout of that data; that is, its field names, field definitions, and data types. Because consents must be passed from company to company, the lack of standardization implies that every company must create a custom integration with every other company.

Another problem with using consents is that, in a complex data supply chain, a consumer may unknowingly give a consent to a vendor through one channel for certain uses of his or her data, and give that same vendor a different set of uses for the same data. Thus, each company has to track its sources of consent and look for inconsistencies, which can be a very laborious and expensive process.

A third problem is that the rules used by companies as to how they store their consents, and how they prioritize which consents have priority, differ from company to company. Thus, the ability to have a consistent view to a consumer's consent across the data supply chain is almost impossible.

Due to these problems, companies currently resort to using legal protection by rewriting contracts with data suppliers that stipulate the data being sourced has consumer consent. The data supplier in turn rewrites its contracts for its own data suppliers and this happens all the way up the consumer data supply chain. Different industries, and even different parts of a single industry, are developing conflicting standards, protocols, and processes for handling consents.

Conversely, regulations such as GDPR require that consumers must be able to invoke a SAR (Subject Access Request) against any company to not only get a copy of the data the company has about that consumer, but also to enable that consumer to "Opt Out" (i.e., remove and not use that data). Currently, companies provide opt-out support by creating internal suppression lists of the consumers that have opted out. There is no standard way to propagate the opt-outs to the original data source so that when the next update of consumer data arrives, that consumer's data will still exist. Meanwhile, consumers not only have to go to each company to ask for the "opt out," but there is currently no easy way for consumers to know which companies have their data so they do not know where to send the opt-out requests. There is no incentive system to create a traditional centralized clearinghouse of consents in order to solve the above problems.

References mentioned in this background section are not admitted to be prior art with respect to the invention.

SUMMARY OF THE INVENTION

The present invention is directed to a decentralized system and method that enables companies to comply with privacy regulations such as GDPR and have a single, consistent source of truth for which consumer consent is the most correct at any given time, for which purposes, and in which environments. Any company that holds and uses consumer data can be assured that they have the most current and up-to-date explicit consent from consumers, even if the data is sourced from other companies. A unique universal consent identifier (consent ID) is generated for consent of data. The consent ID can be passed along with the data, so that anyone down the supply chain that receives the data can refer to the original proof of consent. This allows data provenance to be saved in a shared decentralized ledger, so data provenance can be easily queried. The consent ID also empowers consumers to query as to how their data has been moved through the data supply chain. The consumer data itself, including personally identifiable information (PII) is not stored in the blockchain, only consents and data transfer events; the consent ID allows for the data to be linked with the corresponding data provenance information.

In certain implementations, the system consists of a defined specification of APIs coded in Java with client applications using node.js on top of an open-source distributed ledger technology, Hyperledger Fabric. The API in these implementations has 3 main sections:

1. Consent API: The Consent API allows companies that collect the original consumer data to enter into the consent ledger the original consumer consent. The consent ledger is implemented within the Hyperledger immutable distributed data store. The actual consumer data is not written, but only the metadata describing what data and use to which the consumer consented. This API also allows companies to look up consents based on consent ID.
2. Data Transfer API: Each time consumer data is transferred from one company to another, the data transfer API allows the companies to write a data transfer entry into the data transfer leger (also implemented within the Hyperledger immutable distributed data store). The data transfer entry contains the associated consent ID. Thus, wherever that consumer data propagates, any company along that consumer data supply chain would have a direct link to the original consent.
3. Subscription API: The Subscription API allows companies to be notified of any changes to a given consent. Thus, if a user opts out or changes the original consent, all companies that subscribe to the notification will be notified.

The key components to the invention, in certain implementations, are the three APIs described above; a distributed ledger data store; a company-specific internal consent management system; a privacy portal; and an auditing portal.

Like other blockchain systems, the value of the system follows the characteristics of the network effect phenomenon. The more companies that participate in the system (i.e., more companies register consents and data transfers into the ledgers), then the higher the value of the system. The decentralized nature of the system requires a consortium approach where participants share in the cost of running the decentralized nodes and also commit to registering consents and data transfers into the system.

Using the invention, suppliers of consumer and other data will benefit because it greatly eases their compliance with privacy regulations such as GDPR. The invention also benefits advertisers and marketers, who can be assured of the provenance of data that they are being provided as part of a marketing campaign. Finally, the invention benefits consumers because they may more easily monitor and control access to and use of their personal data.

These and other features, objects and advantages of the present invention will become better understood from a consideration of the following detailed description of the preferred embodiments and appended claims in conjunction with the drawings as described following:

DETAILED DESCRIPTION

Figure 1:
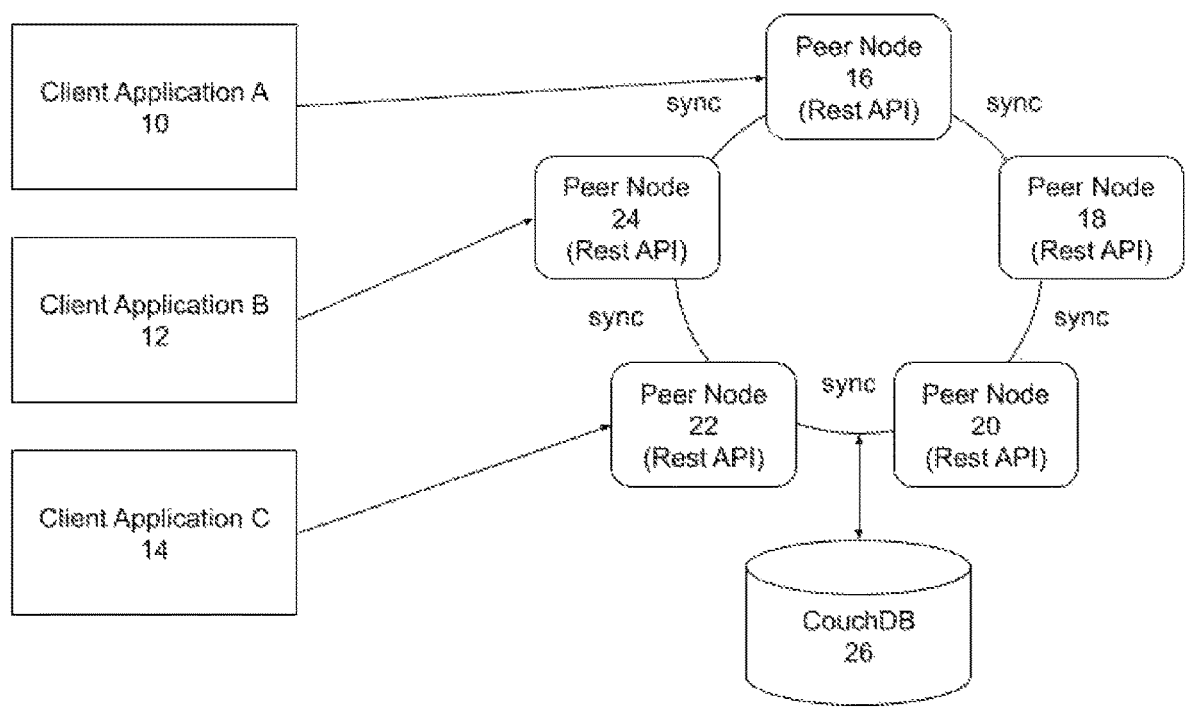
FIG. 1 is a diagram illustrating the overall system architecture for certain implementations of the present invention.

An overall architecture for a system according to an implementation of the invention is shown in FIG. 1. The sample architecture in FIG. 1 shows the peer nodes 16, 18, 20, 22, and 24 (in this case there are five, but any number could be used) of the Hyperledger distributed ledger system, all connected to the fabric world state as implemented in the CouchDB database 26. The Rest API running on each of the peer nodes implements the Consent, Data Transfer, and Subscription APIs. The client applications 10, 12, and 14 (e.g., internal consent management systems, the privacy portals, and the regulator portals) call the API service on their preferred peer node; however, any peer node would provide the same functionality and could be used alternatively. In this sample implementation architecture, the client applications 10, 12, and 14 are written in node.js, but could be implemented using any technology that can invoke the Rest API of a peer node 16, 18, 20, 22, or 24. For more robust implementations, there would be API gateways and routing services between the client application and the Rest API service (not shown), but those are not necessary for the system to function.

Figure 2:
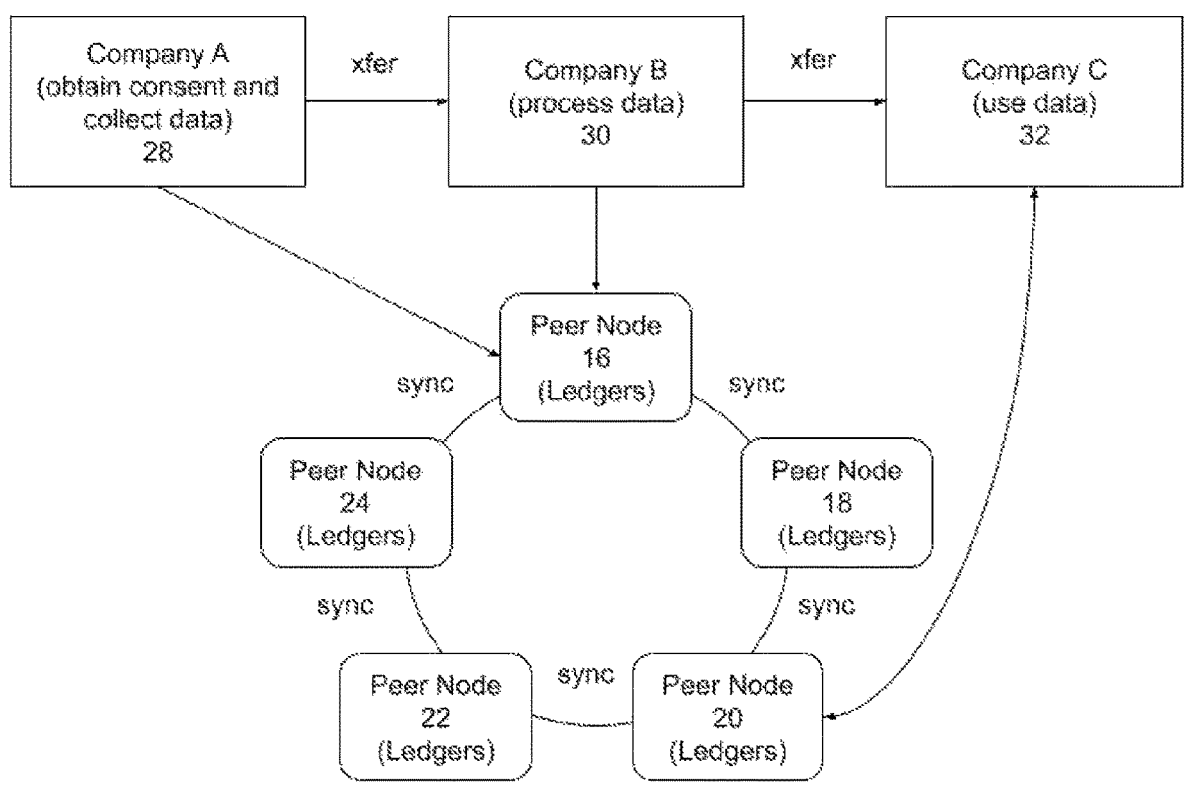
FIG. 2 is a data flow diagram illustrating a method of propagating consents in certain implementations of the present invention.

Referring now to FIG. 2, the method by which consents are propagated through the system may be explained in accordance with an example. Note, each peer has the API service so calling any peer will work as the peer nodes will synchronize with each other in blockchain ledger fashion. At step 28, Company A's system collects consent from the relevant consumer and gathers consumer data. Company A's website calls the Consent API on the Peer node 16 to enter a new consent to the consent ledger. Peer node 16 uses a distributed ledger consensus protocol to sync with all other peer nodes on the distributed ledger, so that all nodes have the new consent.

At step 30, Company A sells and transfers data to company B. Company A's system calls the Data Transfer API on the Peer node 16 to enter the data transfer information in the data transfer ledger. The user consent ID is part of the data transfer entry. Peer node 16 uses distributed ledger consensus protocol to sync with all other peer nodes on the distributed ledger, so all nodes have the new data transfer entry.

At step 32, Company B sends data to Company C for an advertising campaign. Company B's system calls the Data Transfer API on the Peer node 16 to enter the data transfer information in the data transfer ledger. The consent ID is passed along into this new data transfer entry. Peer node 16 uses distributed ledger consensus protocol to sync with all other peer nodes on the distributed ledger, so all nodes have the new data transfer entry. After receiving the data, Company C then validates that explicit consumer consent is there to use the data for marketing purposes. In order to validate, Company C's system calls the Consent API on peer node 20 to look up the consent details and verify that the consent allows marketing purposes. It may be noted again that each of the peer nodes could perform this same functionality, and thus the calls just described to a peer node may be performed with respect to any peer node.

Figure 3:
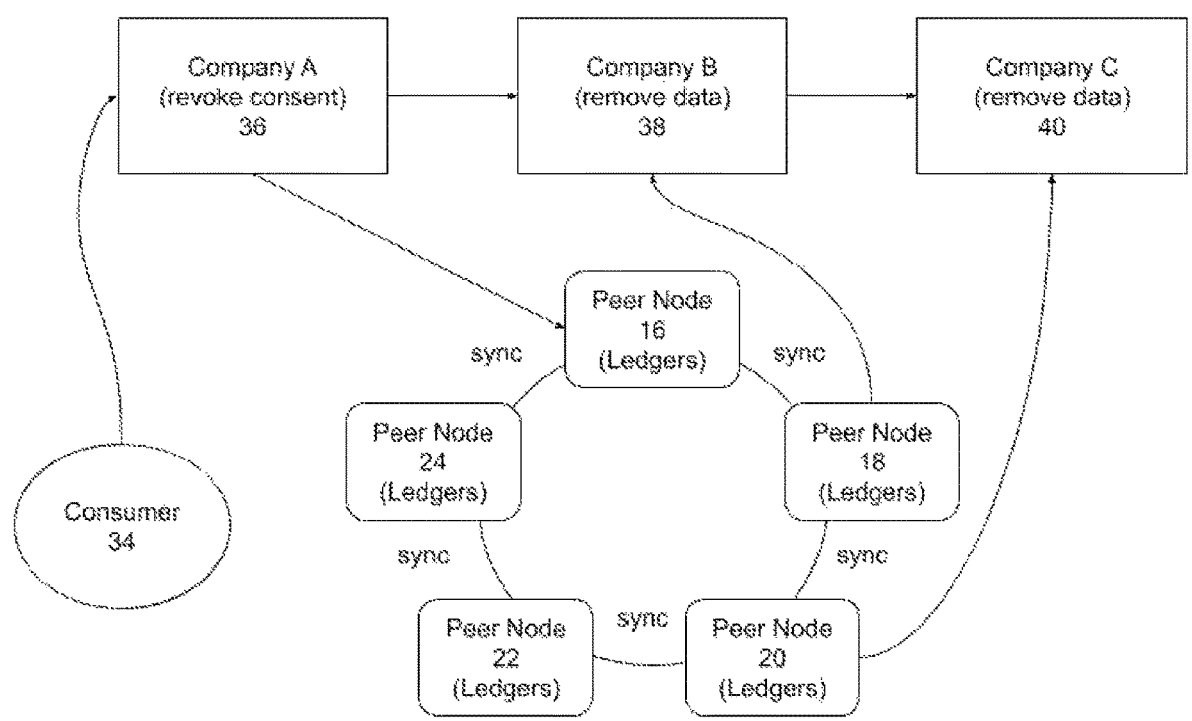
FIG. 3 is a data flow diagram illustrating a method of revoking consents (opting out) in certain implementations of the present invention.

Referring now to FIG. 3, the method by which a consumer may opt out using the system may be described. The processing begins by consumer 34 contacting the company and requesting an opt-out. At step 36, Peer node 16 uses distributed ledger consensus protocol to sync with all other peer nodes on the distributed ledger, so all nodes now have revoked consent.

At step 38, the Subscription API On Peer node 18 detects that the consent has been revoked and sends a notification to Company B's system because previously Company B system had subscribed to notification for that consent.

At step 40, the Subscription API on peer node 20 detects that the consent has been revoked and sends a notification to Company C's system because previously Company C's system had subscribed to notification for that consent. It may be noted that using standard redundancy protocol, the Subscription API will have a primary and secondary peer node to ensure that one node being down will not cause notification not to be sent, but that the particular nodes that perform these functions may change.

Figure 4:
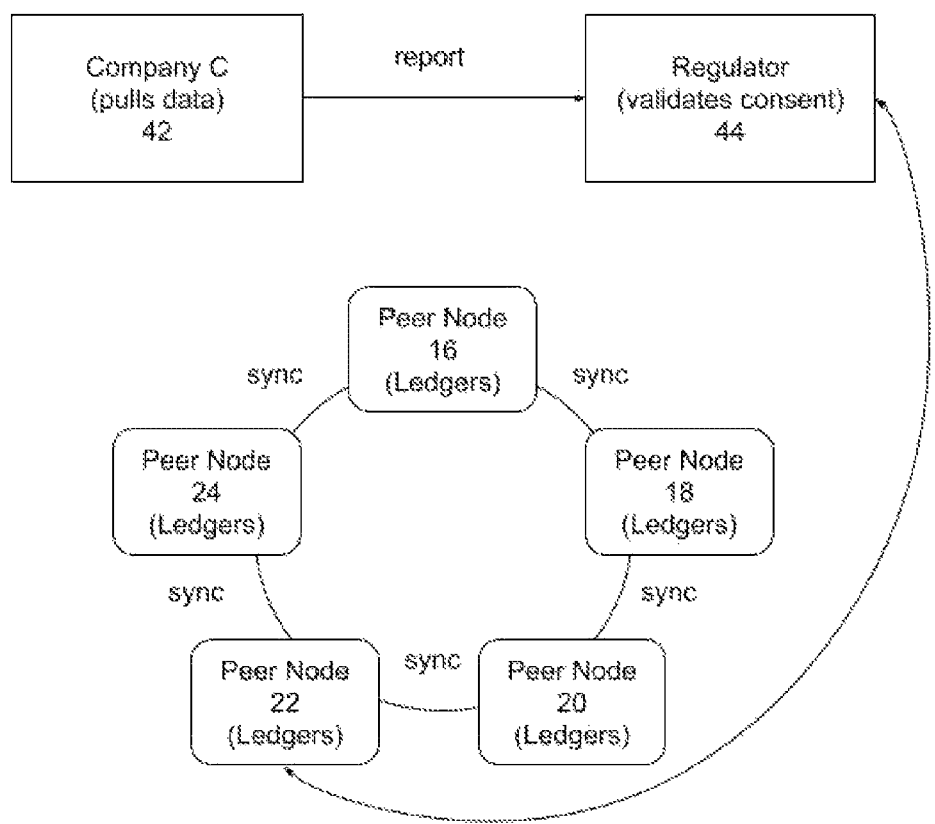
FIG. 4 is a data flow diagram illustrating a method of validating consents in certain implementations of the present invention.

Referring now to FIG. 4, the method by which the system may perform a regulator function by checking for compliance may be explained with reference to a particular example. Suppose that Company C is audited by the regulator. At step 42, the Company C system sends the requested data with associated consent IDs to the regulator. The regulator calls the Peer node 22 Consent API to validate that all data has valid consents. Peer node 22 then returns to the regular the requested validation data.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

All terms used herein should be interpreted in the broadest possible manner consistent with the context. When a grouping is used herein, all individual members of the group and all combinations and sub-combinations possible of the group are intended to be individually included in the disclosure. All references cited herein are hereby incorporated by reference to the extent that there is no inconsistency with the disclosure of this specification. If a range is expressed herein, such range is intended to encompass and disclose all sub-ranges within that range and all particular points within that range.

The invention claimed is:

1. A method for propagating consumer consents through a distributed ledger system comprising a plurality of peer nodes, comprising the method steps of:
   a. at an original data server, collecting an item of consumer data and a consumer consent, wherein the consumer consent comprises data indicative of whether a consumer has consented to use of personal data concerning such consumer;
   b. calling a first consent application programming interface (API) at one of the plurality of peer nodes to enter the consumer consent and a consumer identifier (consumer ID) in a consent ledger at such peer node;
   c. syncing the consumer consent and consumer ID in the consent ledger at such peer node with each of the other peer nodes;
   d. transferring the consumer data from the original data server to a transferee server;
   e. calling a first data transfer API at one of the peer nodes to enter data transfer data into a data transfer ledger at such peer node; and
   f. syncing the data transfer data in the consent ledger at such peer node with each of the other peer nodes.

2. The method of propagating consumer consents of claim 1, further comprising the steps of:
   a. transferring the consumer data from the transferee server to an advertising server;
   b. calling a second data transfer API at one of the plurality of peer nodes to enter data transfer data into the data transfer ledger at such peer node; and
   c. syncing the data transfer data in the consent ledger at such peer node with each of the other peer nodes.

3. The method of propagating consumer consents of claim 2, further comprising the step of calling a third consent API at one of the plurality of peer nodes to retrieve the consumer consent from such node.

4. A method for consumer opting out, comprising the method steps of:
   a. at an original data server, receiving a consumer message requesting an opt out for use of consumer data pertaining to such consumer;
   b. calling a first consent application programming interface (API) at a first peer node of a plurality of peer nodes to enter the opt out and a consumer identifier (consumer ID) in a consent ledger at the first peer node, wherein the first peer node is one of the plurality of peer nodes forming a distributed peer node network;
   c. syncing the opt out in the consent ledger at the first peer node with each of the other peer nodes;
   d. detecting, at a second consent ledger at a second peer node using a second subscription API, that the consumer has opted out, and sending through the second subscription API to a transferee server an opt-out message; and
   e. detecting, at a third consent ledger at a third peer node and using a third subscription API, that the consumer has opted out, and sending through the third subscription API to an advertising server an opt-out message, wherein any or all of the first, second, and third peer nodes may be the same peer node.

5. The method for consumer opting out of claim 4, wherein if any of the second or third subscription APIs are down due to the second or third nodes being down, sending through a fourth subscription API at a fourth peer node an opt-out message, wherein the fourth peer node is a back-up node if the second or third peer nodes are down.

6. The method for consumer opting out of claim 5, further comprising the method steps of:
   a. receiving, at an advertising server, an audit request from a regulator server; and
   b. receiving, at a fifth peer node, the audit request from the regulator server and sending the audit request to a fifth consent application programming interface (API) in order to validate that all consumer data used by the advertising server has corresponding valid consent data, wherein the fifth peer node is one of a plurality of peer nodes forming a peer node network.

* * * * *